United States Patent
Domoto (10) Patent No.: US 10,363,835 B2
(45) Date of Patent: Jul. 30, 2019

(54) RAILROAD SYSTEM

(71) Applicant: KABUSHIKI KAISHA TOSHIBA, Minato-ku, Tokyo (JP)

(72) Inventor: Takafumi Domoto, Fuchu Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 132 days.

(21) Appl. No.: 15/445,775

(22) Filed: Feb. 28, 2017

(65) Prior Publication Data

US 2017/0166085 A1    Jun. 15, 2017

Related U.S. Application Data

(63) Continuation of application No. PCT/JP2014/072786, filed on Aug. 29, 2014.

(51) Int. Cl.
*B60M 3/02* (2006.01)
*B60L 9/18* (2006.01)
(Continued)

(52) U.S. Cl.
CPC ............. *B60M 3/02* (2013.01); *B60L 7/14* (2013.01); *B60L 9/18* (2013.01); *B60L 50/51* (2019.02); *B60L 50/53* (2019.02); *B60L 53/14* (2019.02); *B60L 55/00* (2019.02); *B60L 58/12* (2019.02); *B60M 3/06* (2013.01); *B61C 3/02* (2013.01);
(Continued)

(58) Field of Classification Search
None
See application file for complete search history.

(56) References Cited

U.S. PATENT DOCUMENTS

| | | | |
|---|---|---|---|
| 2008/0238358 A1 | 10/2008 | Koide et al. | |
| 2015/0180242 A1* | 6/2015 | Kono | B60L 7/14 320/134 |
| 2015/0314699 A1* | 11/2015 | Wakasugi | B60L 7/14 307/9.1 |

FOREIGN PATENT DOCUMENTS

| | | | | |
|---|---|---|---|---|
| EP | 2645467 A1 * | 10/2013 | | B60L 11/1859 |
| JP | 08086853 A | 4/1996 | | |

(Continued)

OTHER PUBLICATIONS

JP2012175803 translation Shimoya, Railway System Equipped With Power Storage Means, 9-12 JP2012175803 (Year: 2012).*

(Continued)

*Primary Examiner* — Robert J Grant
*Assistant Examiner* — Tynese V McDaniel
(74) *Attorney, Agent, or Firm* — Holtz, Holtz & Volek PC (57) ABSTRACT

A railroad system includes a first vehicle and a second vehicle. The first vehicle includes a drive-part, an inverter, an electric storage device, and a control part. The control part controls feasibility of charge or discharge of the electric storage device based on a detection value of any of a charge accumulation amount of the electric storage device, a distance between the first vehicle and the second vehicle, or a voltage value of a power line. When it is assumed that the detection value when charge or discharge of the electric storage device is switched from an allowable state to a prohibited state is a first set value, and the detection value when charge or discharge of the electric storage device is switched from a prohibited state to an allowable state is a second set value, the first set value and the second set value are different from each other.

4 Claims, 7 Drawing Sheets

(51) Int. Cl.
*H02J 7/00* (2006.01)
*B60L 7/14* (2006.01)
*B60M 3/06* (2006.01)
*B61C 3/02* (2006.01)
*H02M 3/04* (2006.01)
*H02M 7/537* (2006.01)
*B60L 53/14* (2019.01)
*B60L 50/53* (2019.01)
*B60L 50/51* (2019.01)
*B60L 55/00* (2019.01)
*B60L 58/12* (2019.01)

(52) U.S. Cl.
CPC .............. *H02J 7/00* (2013.01); *H02J 7/0068* (2013.01); *H02M 3/04* (2013.01); *H02M 7/537* (2013.01); *B60L 2200/26* (2013.01); *B60L 2210/10* (2013.01); *B60L 2210/40* (2013.01); *B60L 2240/547* (2013.01); *B60L 2240/625* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 10/7216* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y04S 10/126* (2013.01)

(56) References Cited

FOREIGN PATENT DOCUMENTS

| | | | | |
|---|---|---|---|---|
| JP | 2007125913 A | * | 5/2007 | |
| JP | 2007125913 A | | 5/2007 | |
| JP | 2008113512 A | | 5/2008 | |
| JP | 2008154355 A | | 7/2008 | |
| JP | 3162887 U | | 9/2010 | |
| JP | 2012050170 A | | 3/2012 | |
| JP | 2012175803 A | * | 9/2012 | |
| JP | 2012175803 A | | 9/2012 | |
| JP | 2013059144 A | | 3/2013 | |
| JP | 2013123280 A | | 6/2013 | |
| JP | 2013195232 A | | 9/2013 | |
| JP | 2014121246 A | | 6/2014 | |

OTHER PUBLICATIONS

WO 2014097705 Wakasugchi, Charging and Discharging Control Device, Charging and Discharging Control Method, (Year: 2014).*
JP2007125913 translation, Yoshida, Hybrid Control Unit for Hybrid Car (Year: 2007).*
International Search Report (ISR) and Written Opinion dated Nov. 4, 2014 issued in International Application No. PCT/JP2014/072786.
Akihiro Gion, "The High Precision Train Position Detection System which used the Speed Dynamo and the Inertia Sensor Together", Railway Technical Research Institute Monthly Exhibition Lecture.

* cited by examiner

# RAILROAD SYSTEM

CROSS REFERENCE TO RELATED APPLICATIONS

This application is based upon and claims the benefit of priority from the prior International Patent Application No. JP2014/072786, filed on Aug. 29, 2014, the entire contents of which are incorporated herein by reference.

FIELD

The embodiments of the present invention relate to a railroad system.

BACKGROUND

In recent railroad systems, hybrid vehicles have been introduced for energy saving. A hybrid vehicle includes an electric storage device and can travel by using both the energy from an overhead line and the energy from the electric storage device. The electric storage device of the hybrid vehicle discharges for assisting during power running or absorbs and charges the energy during power regeneration.

The electric storage device of the hybrid vehicle generally discharges to assist the own vehicle or charges the regenerative energy of the own vehicle during traveling. It is also considered that the electric storage device of the hybrid vehicle also discharges to assist another vehicle via an overhead line or recovers the regenerative energy of another vehicle.

However, in the conventional railroad system, it has been difficult to switch charge and discharge of the electric storage device at an appropriate timing corresponding to the state of the own vehicle and another vehicle or the state of the electric storage device.

DETAILED DESCRIPTION

Embodiments will now be explained with reference to the accompanying drawings.

A railroad system according to an embodiment is a railroad system including a first vehicle and a second vehicle electrically connected to a certain power line. The first vehicle includes a drive part, an inverter configured to drive the drive part by acquiring power from the power line, an electric storage device configured to supply power to the power line or accumulate power from the power line, and a control part. The control part controls feasibility of charge or discharge of the electric storage device based on a detection value of any of a charge accumulation amount of the electric storage device, a distance between the first vehicle and the second vehicle, or a voltage value of the power line. When it is assumed that the detection value when charge or discharge of the electric storage device is switched from an allowable state to a prohibited state is a first set value, and the detection value when charge or discharge of the electric storage device is switched from a prohibited state to an allowable state is a second set value, the first set value and the second set value are different from each other.

Embodiments of the present invention will be described below in detail with reference to the accompanying drawings. These embodiments do not limit the present invention.

Figure 1:
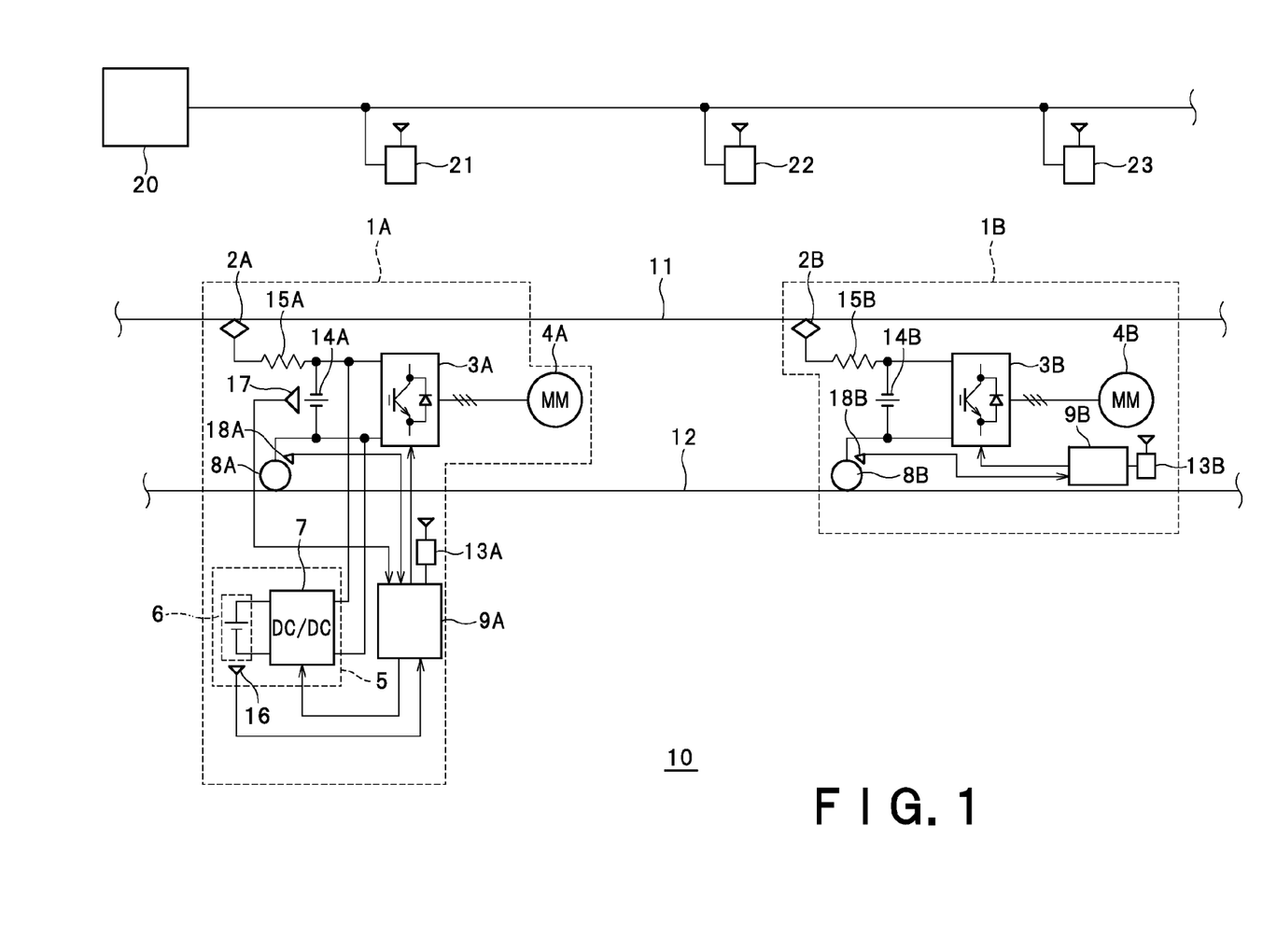
FIG. 1 is a diagram illustrating a schematic configuration of a railroad system 10 according to an embodiment of the present invention.

FIG. 1 is a diagram illustrating a schematic configuration of a railroad system 10 according to an embodiment of the present invention. The railroad system 10 includes a first vehicle 1A and a second vehicle 1B. The first and second vehicles 1A and 1B are connected commonly (in parallel) between a power line 11 and a power line 12. For example, the power line 11 is a high-voltage overhead line, and is brought into contact with pantographs 2A and 2B of the respective first and second vehicles 1A and 1B. For example, the power line 12 is a ground-voltage railway track, and is brought into contact with wheels 8A and 8B of the respective first and second vehicles 1A and 1B. Accordingly, the first and second vehicles 1A and 1B receive power supply from the power lines 11 and 12.

The first vehicle 1A includes the pantograph 2A, an inverter 3A, a motor 4A, an electric storage device 5, the wheels 8A, a controller 9A, a communication part 13A, a capacitor 14A, a filter reactor 15A, a charge-amount detector 16, a voltage detector 17, and a rotary encoder 18.

As described above, the pantograph 2A is brought into contact with the power line 11, and the wheels 8A are brought into contact with the power line 12. Accordingly, power is supplied to the first vehicle 1A.

The inverter 3A converts DC power acquired from the power lines 11 and 12 to AC power, and supplies the AC power to the motor 4A. The motor 4A as a drive part is driven by the AC power from the inverter 3A. The motor 4A rotates the wheels 8A.

The electric storage device 5 includes an electric storage element 6 and a DC-DC converter 7, and is connected to an input side of the DC power of the inverter 3A. At the time of charging the electric storage element 6, the DC-DC converter 7 accumulates the DC power from the power lines 11 and 12 or the inverter 3A in the electric storage element 6. At the time of discharge from the electric storage element 6, the DC-DC converter 7 supplies power in the electric storage element 6 to the power lines 11 and 12 or the inverter 3A. Although not particularly limited thereto, the electric storage element 6 can be, for example, a secondary battery or a large-capacity capacitor. In this manner, the electric storage device 5 supplies power to the power lines 11 and 12 or the inverter 3A, or accumulates power from the power lines 11 and 12 or the inverter 3A.

The controller 9A controls respective constituent elements of the first vehicle 1A. For example, the controller 9A controls the operation of the inverter 3A and the operation of the electric storage device 5. In operation control of the electric storage device 5, the controller 9A controls feasibility of charge or discharge to or from the electric storage device 5 based on a detection value of any of a charge accumulation amount (SOC (State Of Charge)) of the electric storage device 5, a distance between the first vehicle 1A and the second vehicle 1B, or a voltage value of the power lines 11 and 12. Control of the electric storage device 5 will be described later in detail.

The communication part 13A is connected communicably with a communication part 13B of the second vehicle 1B, and/or connected communicably with a central management part 20 via base stations 21 to 23 installed on the ground. The communication part 13A can transmit information of the first vehicle 1A to the central management part 20 and/or the second vehicle 1B, or can receive information of the second vehicle 1B from the central management part 20 and/or the second vehicle 1B. Accordingly, the first vehicle 1A can receive position information of the second vehicle 1B, and calculate the distance between the own vehicle 1A and the second vehicle 1B (L illustrated in FIG. 3) by comparing position information of the own vehicle 1A and the position information of the second vehicle 1B. Needless to mention, the first vehicle 1A can acquire the distance between the own vehicle 1A and the second vehicle 1B by using a GPS (Global Positioning System).

The capacitor 14A and the filter reactor 15A function as a low-pass filter for stabilizing the DC power input to the inverter 3A.

The charge-amount detector 16 detects a charge amount (SOC) accumulated in the electric storage element 6. As for detection of the charge amount (SOC), the charge amount (SOC) can be calculated based on integration of charge current or discharge current. Alternatively, the charge amount (SOC) can be calculated based on an open-circuit voltage of the electric storage element 6. Integration of the charge current or the discharge current can be performed by the controller 9A.

The voltage detector 17 detects a voltage applied to the capacitor 14A. The voltage applied to the capacitor 14A depends on the voltage applied between the power line 11 and the power line 12. Accordingly, the voltage detector 17 or the controller 9A can recognize the voltage applied between the power line 11 and the power line 12 by detecting the voltage applied to the capacitor 14A.

A rotary encoder 18A detects a travel distance of the first vehicle 1A by detecting rotation of the wheels 8A. Accordingly, the first vehicle 1A can recognize the position information of the own vehicle 1A, and can transmit the position information of the first vehicle 1A to the second vehicle 1B directly or via the central management part 20.

In this manner, the first vehicle 1A is a so-called "hybrid vehicle", and travels by receiving power supply from the power lines 11 and 12 or can travel by receiving assistance of power from the electric storage device 5. The first vehicle 1A can also accumulate power from the power lines 11 and 12 in the electric storage device 5, or can accumulate regenerative power at the time of braking in the electric storage device 5.

Meanwhile, the second vehicle 1B is a normal vehicle that does not include the electric storage device 5, and includes the pantograph 2B, an inverter 3B, a motor 4B, the wheels 8B, a controller 9B, a communication part 13B, a capacitor 14B, and a filter reactor 15B. The respective configurations and functions of the pantograph 2B, the inverter 3B, the motor 4B, the wheels 8B, the controller 9B, the communication part 13B, the capacitor 14B, and the filter reactor 15B can be respectively identical those of the pantograph 2A, the inverter 3A, the motor 4A, the wheels 8A, the controller 9A, the communication part 13A, the capacitor 14A, and the filter reactor 15A of the first vehicle 1A. However, because the second vehicle is a normal vehicle that does not include the electric storage device 5, the controller 9B does not need to control the electric storage device.

Specific embodiments are described below. In the following embodiments, the first vehicle 1A can be during traveling or can be in a stop (standby) state. The second vehicle 1B is traveling and can be in a power running state or a regenerating state.

First Embodiment

Figure 2:
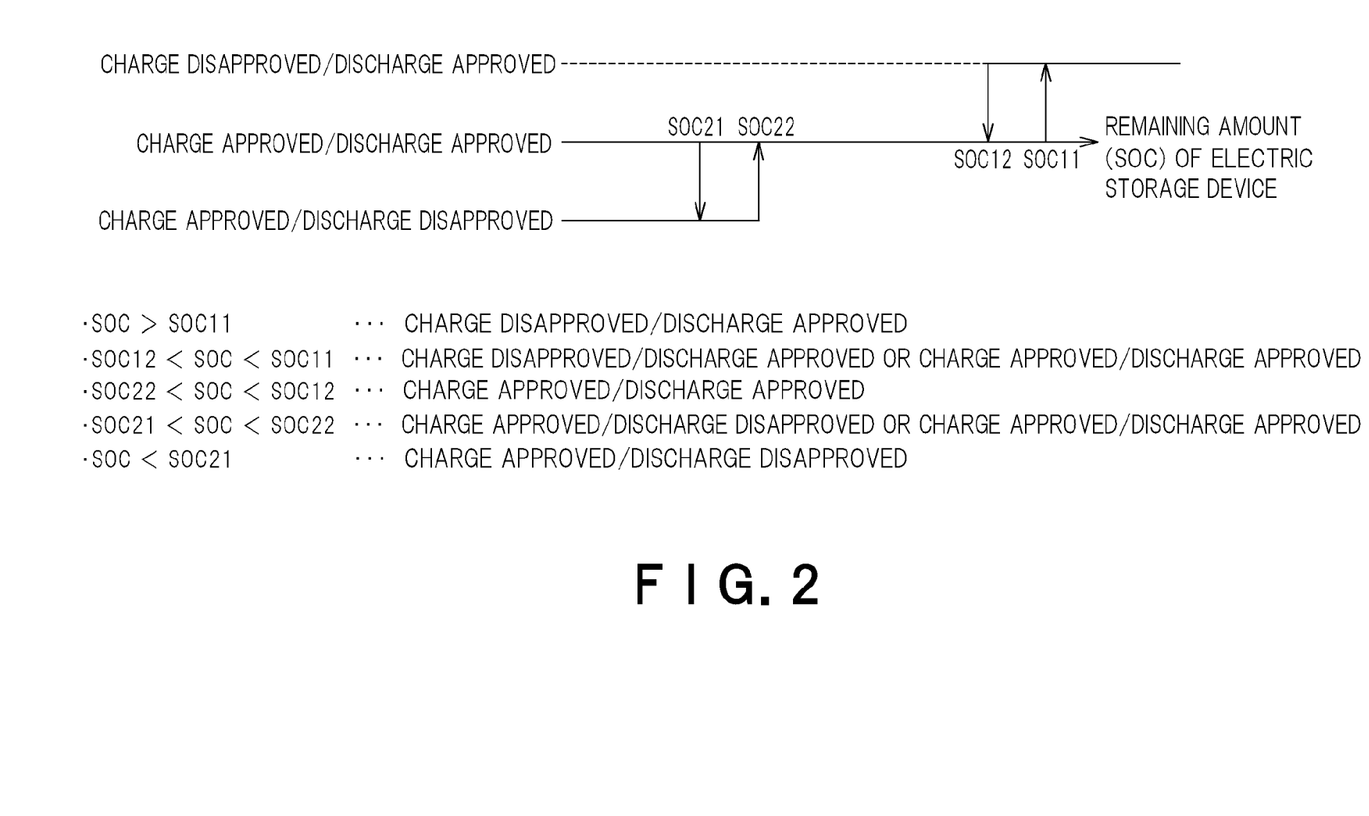
FIG. 2 is a graph illustrating feasibility of charge and discharge of an electric storage device 5 according to a first embodiment.

FIG. 2 is a graph illustrating feasibility of charge and discharge of the electric storage device 5 according to a first embodiment. In the present embodiment, the controller 9A controls feasibility of charge or discharge the electric storage device 5 based on the detection value SOC (hereinafter, also simply "SOC") of a charge accumulation amount of the electric storage device 5. A vertical axis denotes feasibility of charge and discharge, and a horizontal axis denotes the SOC of the electric storage device 5.

(When SOC>SOC 11)

When the SOC of the electric storage device 5 is larger than a first set value SOC 11, the controller 9A allows discharge from the electric storage device 5 and prohibits charge to the electric storage device 5. For example, it is assumed that the first set value SOC 11 is set to 80% of a fully charged state (SOC=100%) of the electric storage device 5. In this case, if the charge accumulation amount of the electric storage device 5 exceeds 80% of the fully charged state (if the SOC exceeds the SOC 11), the electric storage device 5 can discharge power to the power lines 11 and 12. However, the electric storage device 5 cannot charge power from the power lines 11 and 12, but power from the power lines 11 and 12 cannot be charged thereto. That is, when the charge accumulation amount of the electric storage device 5 is approximate to the fully charged state, the controller 9A prohibits charge to the electric storage device 5, and allows discharge from the electric storage device 5. Accordingly, while suppressing that the electric storage device 5 becomes an overcharged state, power can be supplied to the power lines 11 and 12. By suppressing that the electric storage device 5 becomes an overcharged state, soundness of the electric storage device 5 can be maintained, and the service life of the electric storage element 6 can be extended.

Power supplied from the electric storage device 5 of the first vehicle 1A to the power lines 11 and 12 is supplied to the second vehicle 1B via the power lines 11 and 12. Accordingly, the second vehicle 1B can travel by receiving power supply from the electric storage device 5 of the first vehicle 1A. That is, although the second vehicle 1B is not a hybrid vehicle, the second vehicle 1B can travel by receiving assistance from the electric storage device 5 of the first vehicle 1A.

(When SOC 22<SOC<SOC 12)

When the SOC of the electric storage device 5 is smaller than a second set value SOC 12 and larger than a third set value SOC 22, the controller 9A allows charge to the electric storage device 5 and discharge from the electric storage device 5. The second set value SOC 12 is smaller than the first set value SOC 11. For example, it is assumed that the second set value SOC 12 and the third set value SOC 22 are set respectively to 70% and 30% of the fully charged state (SOC=100%) of the electric storage device 5. That is, when the charge accumulation amount of the electric storage device 5 is larger than 30% of the fully charged state, and smaller than 70% of the fully charged state, the electric storage device 5 can be charged from the power lines 11 and 12, and can discharge power to the power lines 11 and 12. That is, when the charge accumulation amount of the electric storage device 5 is in a state suitable for both charge and discharge, the controller 9A allows both discharge from the electric storage device 5 and charge to the electric storage device 5. This is based on a fact that even if charge and discharge to and from the electric storage device 5 is appropriately performed, the electric storage device 5 hardly becomes an overcharged state or an over-discharged state.

The electric storage device 5 of the first vehicle 1A can recover the regenerative power at the time of braking of the second vehicle 1B via the power lines 11 and 12. Accordingly, the regenerative power from the second vehicle 1B can be used for charging the electric storage device 5 of the first vehicle 1A without wasting the regenerative power from the second vehicle 1B. That is, although the second vehicle 1B is not a hybrid vehicle, the regenerative power from the second vehicle 1B can be charged to the electric storage device 5 of the first vehicle 1A. Further, power supplied from the electric storage device 5 of the first vehicle 1A to the power lines 11 and 12 is supplied to the second vehicle 1B via the power lines 11 and 12. Accordingly, the second vehicle 1B can travel by receiving power supply from the electric storage device 5 of the first vehicle 1A.

(When SOC<SOC 21)

On the contrary, when the SOC of the electric storage device 5 is smaller than a fourth set value SOC 21, the controller 9A allows charge to the electric storage device 5 and prohibits discharge from the electric storage device 5. The fourth set value SOC 21 is smaller than the third set value SOC 22. For example, it is assumed that the fourth set value SOC 21 is set to 20% of the fully charged state (SOC=100%) of the electric storage device 5. In this case, if the charge accumulation amount of the electric storage device 5 falls below 20% of the fully charged state (when SOC falls below SOC 21), the electric storage device 5 can be charged with power from the power lines 11 and 12; however, the electric storage device 5 cannot discharge power to the power lines 11 and 12. That is, when the charge accumulation amount of the electric storage device 5 is small, the controller 9A prohibits discharge from the electric storage device 5 and allows charge to the electric storage device 5. Accordingly, power from the power lines 11 and 12 can be recovered (absorbed), while suppressing that the electric storage device 5 becomes the over-discharged state. By suppressing that the electric storage device 5 becomes an over-discharged state, it can be suppressed that the first vehicle 1A cannot be started up, and the service life of the electric storage element 6 can be extended.

The electric storage device 5 of the first vehicle 1A can recover the regenerative power at the time of braking of the second vehicle 1B via the power lines 11 and 12. Accordingly, the regenerative power from the second vehicle 1B can be used for charging the electric storage device 5 of the first vehicle 1A without wasting the regenerative power from the second vehicle 1B. That is, although the second vehicle 1B is not a hybrid vehicle, the regenerative power from the second vehicle 1B can be charged to the electric storage device 5 of the first vehicle 1A.

(When SOC 12≤SOC≤SOC 11 or SOC 21≤SOC≤SOC22)

When the SOC of the electric storage device 5 is equal to or larger than the second set value SOC 12 and equal to or smaller than the first set value SOC 11, or when the SOC is equal to or larger than the fourth set value SOC 21 and equal to or smaller than the third set value SOC 22, the controller 9A maintains the state of the electric storage device 5 without switching the feasible state of charge and discharge of the electric storage device 5. That is, when the SOC of the electric storage device 5 is between the second set value SOC 12 and the first set value SOC 11, the controller 9A maintains the history of the state in which charge and discharge of the electric storage device 5 are possible or the history of the state in which only discharge is possible. On the other hand, when the SOC of the electric storage device 5 is between the fourth set value SOC 21 and the third set value SOC 22, the controller 9A maintains the history of the state in which charge and discharge of the electric storage device 5 are possible or the history of the state in which only charge is possible.

(Switching of Charge/Discharge State)

Figure 5:
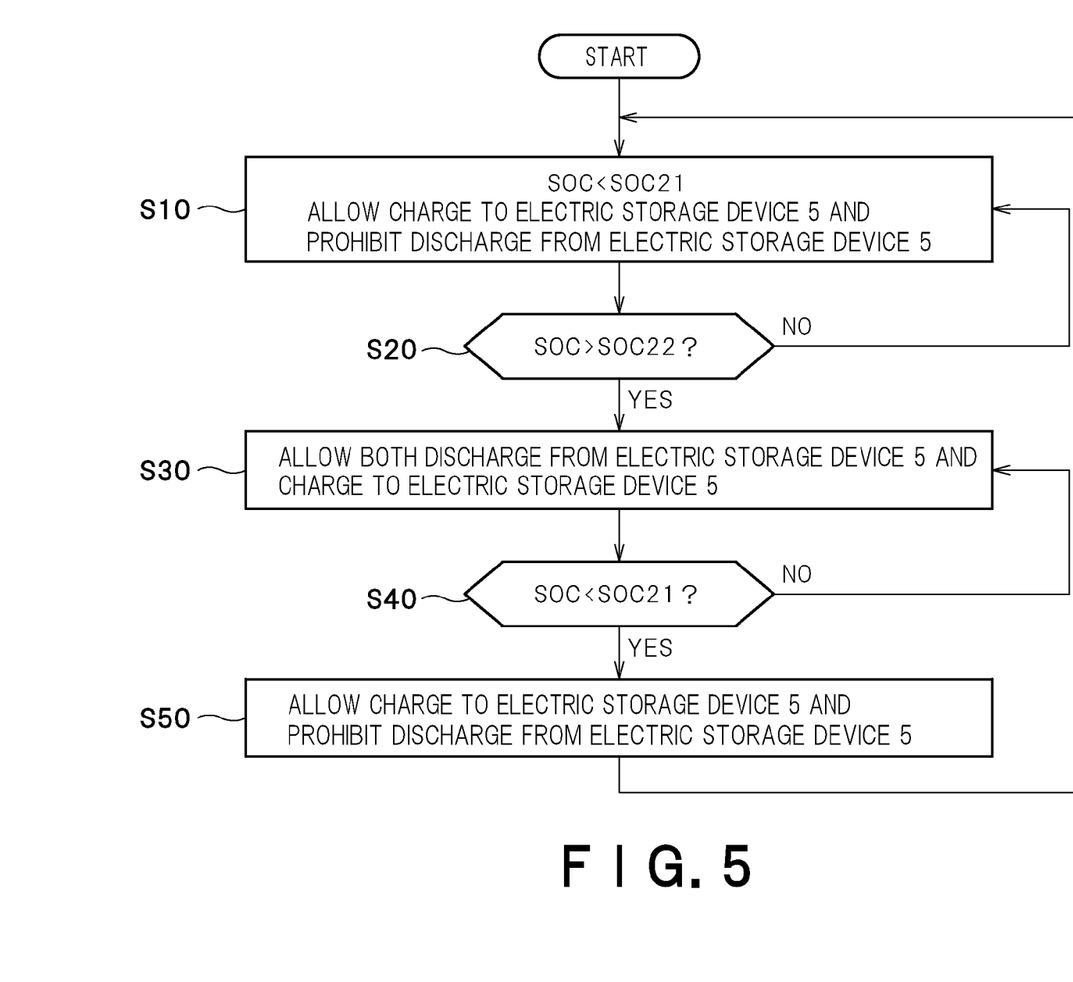
FIG. 5 is a flowchart illustrating switching of a charge/discharge state of the electric storage device 5 according to the first embodiment.
Figure 6:
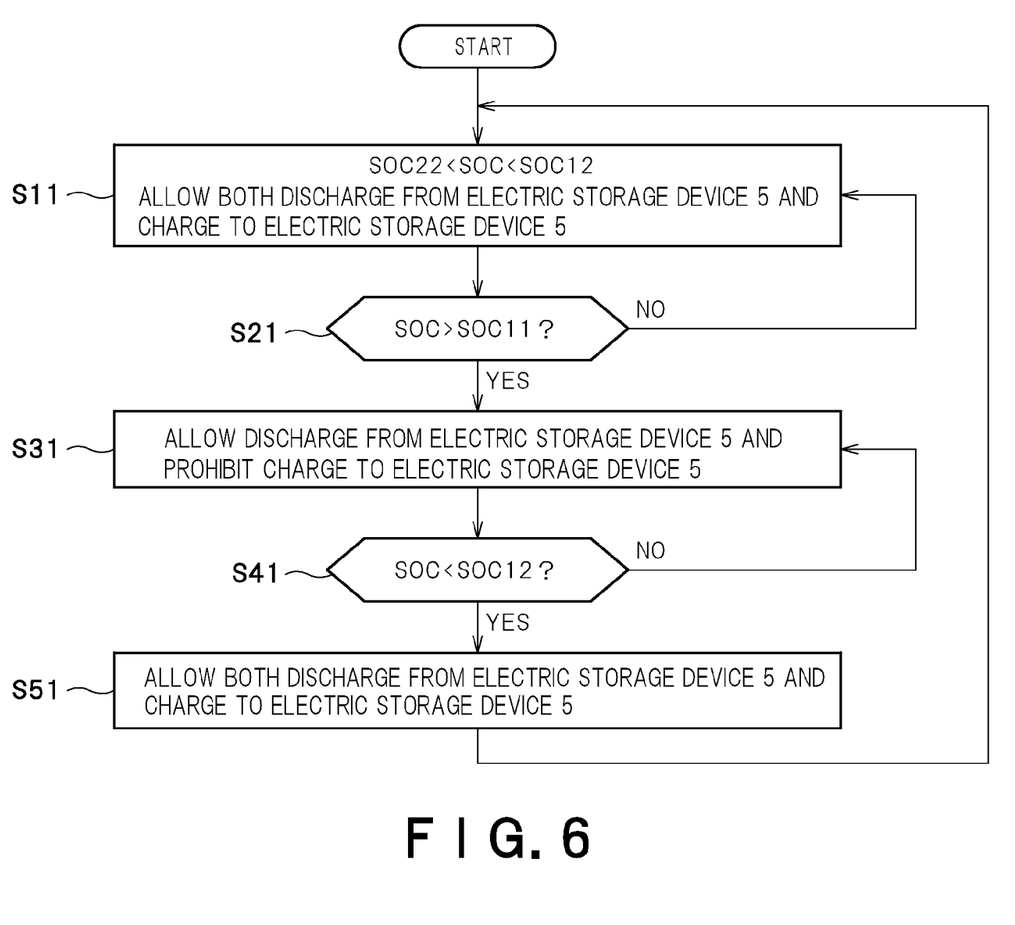
FIG. 6 is a flowchart illustrating switching of the charge/discharge state of the electric storage device 5 according to the first embodiment.

FIG. 5 and FIG. 6 are flowcharts illustrating switching of a charge/discharge state of the electric storage device 5 according to the first embodiment. Switching of the charge/discharge state of the electric storage device 5 is described with reference to FIG. 2, FIG. 5, and FIG. 6.

For example, as illustrated in FIG. 5, when the SOC of the electric storage device 5 is initially smaller than the fourth set value SOC 21, the controller 9A allows charge to the electric storage device 5 and prohibits discharge from the electric storage device 5 (S10). Thereafter, even if the SOC of the electric storage device 5 increases to exceed the fourth set value SOC 21, the controller 9A continuously allows charge to the electric storage device 5 and prohibits discharge from the electric storage device 5 (NO at S20).

When the SOC of the electric storage device 5 further increases to exceed the third set value SOC 22 (YES at S20), as illustrated in FIG. 2, the controller 9A allows both charge and discharge to and from the electric storage device 5 (S30).

On the other hand, even if the SOC of the electric storage device 5 decreases from the state of being larger than the third set value SOC 22 and falls below the third set value SOC 22, the controller 9A maintains the state in which both charge and discharge to and from the electric storage device 5 are allowed (NO at S40).

Thereafter, when the SOC of the electric storage device 5 further decreases to fall below the fourth set value SOC 21 (YES at S40), as illustrated in FIG. 2, the controller 9A allows charge to the electric storage device 5 and prohibits discharge from the electric storage device 5 (S50). Step S50 is in the same state as Step S10 described above. Thereafter, the controller 9A executes control of the electric storage device 5 continuously.

As illustrated in FIG. 6, when the SOC of the electric storage device 5 is initially larger than the third set value SOC 22 and smaller than the second set value SOC 12, the controller 9A allows both charge to the electric storage device 5 and discharge from the electric storage device 5 (S11). Thereafter, even if the SOC of the electric storage device 5 increases to exceed the second set value SOC 12, the controller 9A maintains the state in which both charge and discharge to and from the electric storage device 5 are allowed (NO at S21).

When the SOC of the electric storage device 5 further increases to exceed the first set value SOC 11 (YES at S21), as illustrated in FIG. 2, the controller 9A allows discharge from the electric storage device 5 and prohibits charge to the electric storage device 5 (S31).

On the other hand, even if the SOC of the electric storage device 5 decreases from the state of being larger than the first set value SOC 11 and falls below the first set value SOC 11, the controller 9A maintains the state in which discharge from the electric storage device 5 is allowed and charge to the electric storage device 5 is prohibited (NO at S41).

Thereafter, when the SOC of the electric storage device 5 further decreases to fall below the second set value SOC 12 (YES at S41), as illustrated in FIG. 2, the controller 9A allows both charge and discharge to and from the electric storage device 5 (S51). Step S51 is in the same state as Step S11 described above. Thereafter, the controller 9A executes control of the electric storage device 5 continuously.

As described above, the first set value SOC 11 and the second set value SOC 12, and the third set value SOC 22 and the fourth set value SOC 21 are different from each other, and a relation between the feasible state of charge and discharge of the electric storage device 5 and the SOC has hysteresis. Accordingly, it can be suppressed that the feasible state of charge and discharge of the electric storage device 5 becomes unstable when the SOC is between the first set value SOC 11 and the second set value SOC 12. It can be also suppressed that the feasible state of charge and discharge of the electric storage device 5 becomes unstable when the SOC is between the third set value SOC 22 and the fourth set value SOC 21.

For example, if the first set value SOC 11 and the second set value SOC 12 are set to an equal value, when the SOC of the electric storage device 5 fluctuates near the SOC 11 and the SOC 12, the feasible state of charge and discharge of the electric storage device 5 is switched frequently. Therefore, the feasible state of charge and discharge of the electric storage device 5 becomes quite unstable. Further, if the third set value SOC 22 and the fourth set value SOC 21 are set to an equal value, when the SOC of the electric storage device 5 fluctuates near the SOC 22 and the SOC 21, the feasible state of charge and discharge of the electric storage device 5 is switched frequently. Therefore, the feasible state of charge and discharge of the electric storage device 5 becomes quite unstable.

On the other hand, as in the first embodiment, because the relation between the feasible state of charge and discharge of the electric storage device 5 and the SOC has hysteresis, when the SOC of the electric storage device 5 is between the second set value SOC 12 and the first set value SOC 11, or between the third set value SOC 22 and the fourth set value SOC 21, the controller 9A maintains the history of the feasible state of charge and discharge of the electric storage device 5. Accordingly, the feasible state of charge and discharge of the electric storage device 5 is stabilized without being frequently switched.

Second Embodiment

Figure 3:
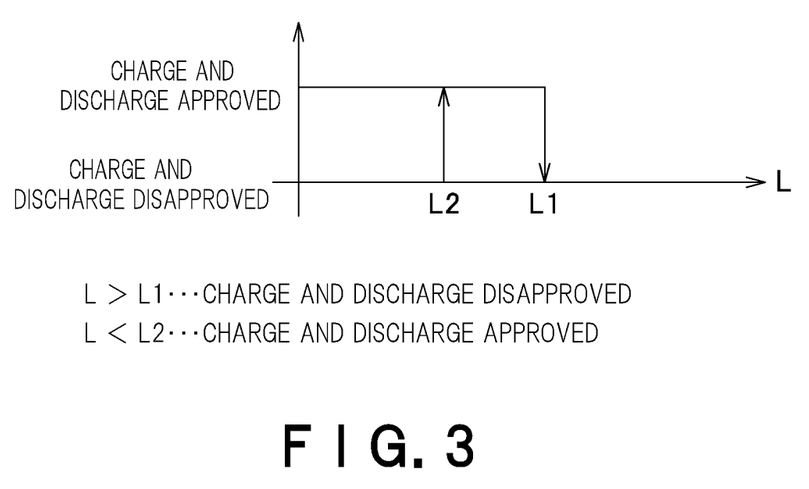
FIG. 3 is a graph illustrating feasibility of charge and discharge of the electric storage device 5 according to a second embodiment.

FIG. 3 is a graph illustrating feasibility of charge and discharge of the electric storage device 5 according to a second embodiment. In the second embodiment, the controller 9A controls feasibility of charge or discharge of the electric storage device 5 based on a detection value L of a distance between the first vehicle 1A and the second vehicle 1B (hereinafter, also simply "distance L"). A vertical axis denotes feasibility of charge and discharge. A horizontal axis denotes the distance L.

(When L>L1)

When the distance L is larger than a first set value L1, the controller 9A prohibits charge and discharge of the electric storage device 5. When the first vehicle 1A supplies power to the second vehicle 1B, or power is recovered from the second vehicle 1B, delivery of power between the first vehicle 1A and the second vehicle 1B is performed via the power lines 11 and 12. Therefore, when the distance L between the first vehicle 1A and the second vehicle 1B is large, power loss due to resistance of the power lines 11 and 12 increases. Therefore, when the distance L is larger than the first set value L1, the controller 9A prohibits charge and discharge of the electric storage device 5. In this case, it is only necessary that the first vehicle 1A and the second vehicle 1B independently travel respectively or stand ready. It is only necessary to decide the first set value L1, taking into consideration various conditions such as the resistance and voltage of the power lines 11 and 12.

(When L<L2)

On the contrary, when the distance L is smaller than a second set value L2, the controller 9A allows charge and discharge of the electric storage device 5. The second set value L2 is smaller than the first set value L1. When the distance L between the first vehicle 1A and the second vehicle 1B is small, power loss due to the resistance of the power lines 11 and 12 is small. Therefore, when the distance L is smaller than the second set value L2, the controller 9A allows charge and discharge of the electric storage device 5.

In this case, the electric storage device 5 of the first vehicle 1A can supply power to the second vehicle 1B via the power lines 11 and 12. Accordingly, the second vehicle 1B can travel by receiving power supply from the electric storage device 5 of the first vehicle 1A. Further, the electric storage device 5 of the first vehicle 1A can recover the regenerative power of the second vehicle 1B via the power lines 11 and 12. Accordingly, the regenerative power from the second vehicle 1B can be used for charging the electric storage device 5 of the first vehicle 1A without wasting the regenerative power from the second vehicle 1B. That is, although the second vehicle 1B is not a hybrid vehicle, the second vehicle 1B can receive assistance from the electric storage device 5 of the first vehicle 1A or can charge the regenerative power to the electric storage device 5.

The second set value L2 can be also decided, taking into consideration various conditions such as the resistance and voltage of the power lines 11 and 12.

(When L2≤L≤L1)

When the distance L is equal to or larger than the second set value L2 and equal to or smaller than the first set value L1, the controller 9A maintains the state of the electric storage device 5 without switching the feasible state of charge or discharge of the electric storage device 5. That is, when the distance L is between the second set value L2 and the first set value L1, the controller 9A maintains the history of the feasible state of charge or discharge of the electric storage device 5.

(Switching of Charge/Discharge State)

Figure 7:
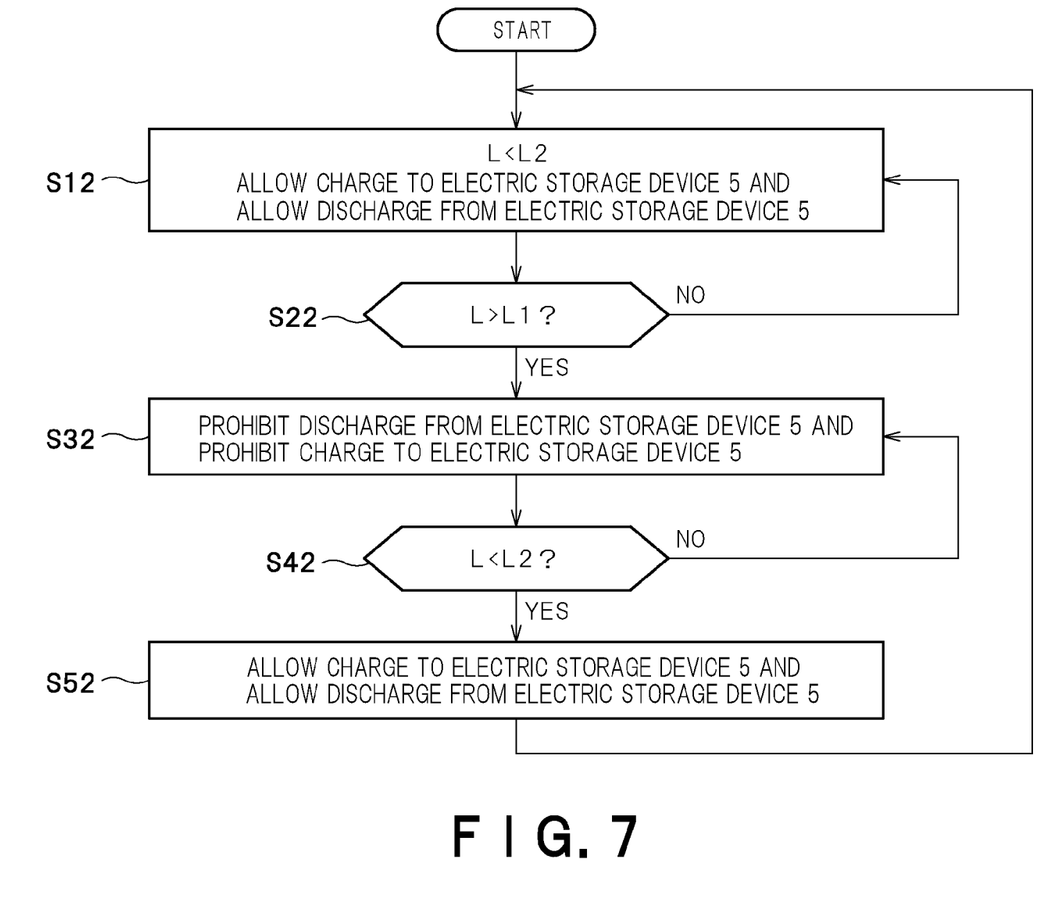
FIG. 7 is a flowchart illustrating switching of a charge/discharge state of the electric storage device 5 according to the second embodiment.

FIG. 7 is a flowchart illustrating switching of a charge/discharge state of the electric storage device 5 according to the second embodiment. Switching of the charge/discharge state of the electric storage device 5 is described with reference to FIG. 3 and FIG. 7.

For example, if the distance L is initially smaller than the second set value L2, the controller 9A allows charge to the electric storage device 5 and discharge from the electric storage device 5 (S12). In this case, even if the first vehicle 1A and the second vehicle 1B are away from each other and the distance L exceeds the second set value L2, the controller 9A does not switch the feasible state of charge or discharge of the electric storage device 5 and continuously allows charge to the electric storage device 5 and discharge from the electric storage device 5 (NO at S22).

When the distance L further increases to exceed the first set value L1 (YES at S22), as illustrated in FIG. 3, the controller 9A switches the feasible state of charge or discharge of the electric storage device 5. That is, the controller 9A prohibits charge to the electric storage device 5 and discharge from the electric storage device 5 (S32).

On the other hand, if the distance L is larger than the first set value L1, the controller 9A prohibits charge to the electric storage device 5 and discharge from the electric storage device 5. In this case, even if the first vehicle 1A and the second vehicle 1B approach each other and the distance L decreases to fall below the first set value L1, the controller 9A does not switch the feasible state of charge or discharge of the electric storage device 5 and continuously prohibits charge to the electric storage device 5 and discharge from the electric storage device 5 (NO at S42).

When the distance L further decreases to fall below the second set value L2 (YES at S42), as illustrated in FIG. 3, the controller 9A switches the feasible state of charge or discharge of the electric storage device 5. That is, the controller 9A allows charge to the electric storage device 5 and discharge from the electric storage device 5 (S52). Step S52 is in the same state as Step S12 described above. Thereafter, the controller 9A executes control of the electric storage device 5 continuously.

As described above, the first set value L1 and the second set value L2 are different from each other, and a relation between the feasible state of charge and discharge of the electric storage device 5 and the distance L has hysteresis. Accordingly, it can be suppressed that the feasible state of charge and discharge of the electric storage device 5 becomes unstable when the distance L is between the first set value L1 and the second set value L2.

For example, if the first set value L1 and the second set value L2 are set to an equal value, when the distance L fluctuates near L1 and L2, the feasible state of charge and discharge of the electric storage device 5 is switched frequently. Therefore, the feasible state of charge and discharge of the electric storage device 5 becomes quite unstable.

On the other hand, as in the second embodiment, because the relation between the feasible state of charge and discharge of the electric storage device 5 and the distance L has hysteresis, when the distance L is between the second set value L2 and the first set value L1, the controller 9A maintains the history of the feasible state of charge or discharge of the electric storage device 5. Accordingly, the feasible state of charge and discharge of the electric storage device 5 is stabilized without being frequently switched.

According to the second embodiment, when the distance L between the first vehicle 1A and the second vehicle 1B is short, the controller 9A allows charge or discharge of the electric storage device 5, and when the distance L between the first vehicle 1A and the second vehicle 1B is long, the controller 9A prohibits charge or discharge of the electric storage device 5. Accordingly, the first vehicle 1A can supply power of the electric storage device 5 to the second vehicle 1B efficiently, and can recover power from the second vehicle 1B efficiently to the electric storage device 5.

Third Embodiment

Figure 4:
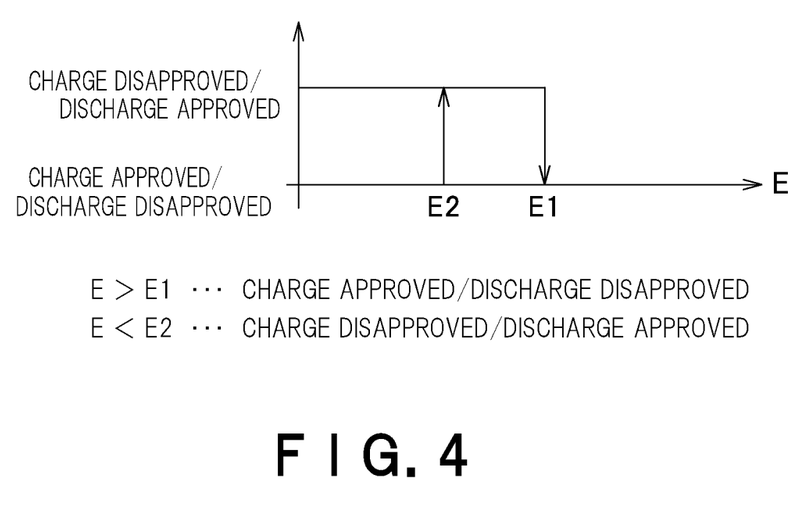
FIG. 4 is a graph illustrating feasibility of charge and discharge of the electric storage device 5 according to a third embodiment.

FIG. 4 is a graph illustrating feasibility of charge and discharge of the electric storage device 5 according to a third embodiment. In the third embodiment, the controller 9A controls feasibility of charge or discharge of the electric storage device 5 based on a detection value E of a voltage value of the power line 11 (or 12) (hereinafter, also simply "voltage value E"). A vertical axis denotes feasibility of charge and discharge. A horizontal axis denotes the voltage value E. The voltage value E can be referred to as a detection value of a voltage difference between the power lines 11 and 12.

(When E>E1)

When the voltage value E is larger than a first set value E1, the controller 9A allows charge to the electric storage device 5 and prohibits discharge from the electric storage device 5. A high voltage value E means that the second vehicle 1B is regenerating power near the first vehicle 1A. That is, because the voltage E is higher than the first set value E1, the controller 9A can determine that the distance between the first vehicle 1A and second vehicle 1B is short and the second vehicle 1B is regenerating power. Therefore, in this case, the controller 9A allows charge to the electric storage device 5 and prohibits discharge from the electric storage device 5.

Accordingly, the regenerative power from the second vehicle 1B can be used for charging the electric storage device 5 of the first vehicle 1A without wasting the regenerative power from the second vehicle 1B. That is, although the second vehicle 1B is not a hybrid vehicle, the regenerative power can be charged to the electric storage device 5 of the first vehicle 1A. Further, it can be suppressed that the voltage of the power line 11 becomes excessively high. It is only necessary to decide the first set value E1, taking into consideration various conditions such as the resistance and voltage of the power lines 11 and 12.

(When E<E2)

On the contrary, when the voltage value E is smaller than a second set value E2, the controller 9A allows discharge from the electric storage device 5 and prohibits charge to the electric storage device 5. The second set value E2 is smaller than the first set value E1. A low voltage value E means that the second vehicle 1B is traveling near the first vehicle 1A, and is power running. That is, the controller 9A can determine that the distance between the first vehicle 1A and the second vehicle 1B is short and the second vehicle 1B is power running, because the voltage value E is lower than the second set value E2. Therefore, in this case, the controller 9A allows discharge from the electric storage device 5 and prohibits charge to the electric storage device 5.

Accordingly, the second vehicle 1B can travel by receiving power supply from the electric storage device 5 of the first vehicle 1A. That is, although the second vehicle 1B is not a hybrid vehicle, the second vehicle 1B can travel by receiving assistance from the electric storage device 5 of the first vehicle 1A. Further, it can be suppressed that the voltage of the power line 11 becomes excessively low. It is only necessary to decide the second set value E2, taking into consideration various conditions such as the resistance and voltage of the power lines 11 and 12.

(When $E2 \leq E \leq E1$)

If the voltage value E is equal to or larger than the second set value E2 and equal to or lower than the first set value E1, the controller 9A maintains the state of the electric storage device 5 without switching the feasible state of charge or discharge of the electric storage device 5. That is, when the voltage value E is between the second set value E2 and the first set value E1, the controller 9A maintains the history of the feasible state of charge or discharge of the electric storage device 5.

(Switching of Charge/Discharge State)

Figure 8:
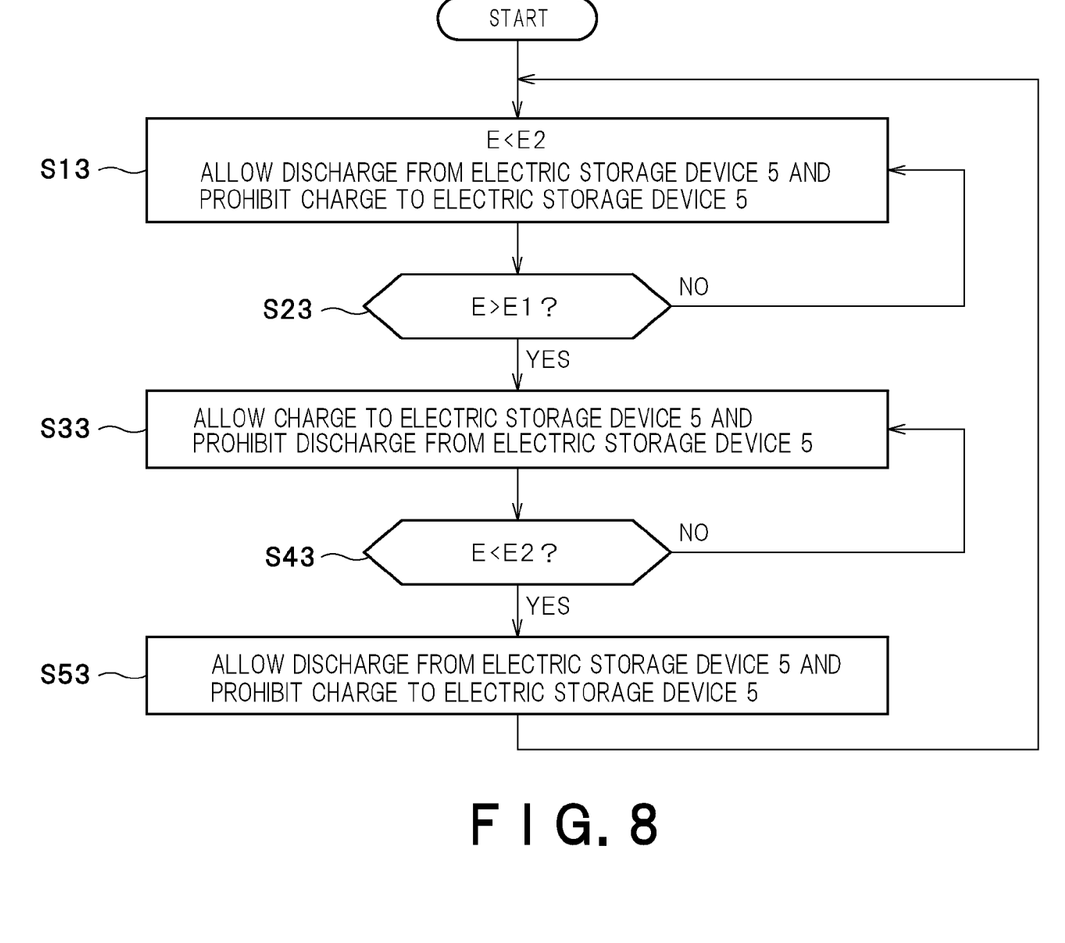
FIG. 8 is a flowchart illustrating switching of a charge/discharge state of the electric storage device 5 according to the third embodiment.

FIG. 8 is a flowchart illustrating switching of a charge/discharge state of the electric storage device 5 according to the third embodiment. Switching of the charge/discharge state of the electric storage device 5 is described with reference to FIG. 4 and FIG. 8.

For example, if the voltage value E is initially smaller than the second set value E2, the controller 9A allows discharge from the electric storage device 5 and prohibits charge to the electric storage device 5 (S13). In this case, even if the voltage value E increases to exceed the second set value E2, the controller 9A does not switch the feasible state of charge or discharge of the electric storage device 5 and continuously allows discharge from the electric storage device 5 and prohibits charge to the electric storage device 5 (NO at S23).

When the voltage value E further increases to exceed the first set value E1 (YES at S23), as illustrated in FIG. 4, the controller 9A switches the feasible state of charge or discharge of the electric storage device 5. That is, the controller 9A allows charge to the electric storage device 5 and prohibits discharge from the electric storage device 5 (S33).

On the other hand, if the voltage value E is larger than the first set value E1, the controller 9A allows charge to the electric storage device 5 and prohibits discharge from the electric storage device 5. In this case, even if the voltage value E decreases and falls below the first set value E1, the controller 9A does not switch the feasible state of charge or discharge of the electric storage device 5, and continuously allows charge to the electric storage device 5 and prohibits discharge from the electric storage device 5 (NO at S43).

When the voltage value E further decreases to fall below the second set value E2 (YES at S43), as illustrated in FIG. 4, the controller 9A switches the feasible state of charge or discharge of the electric storage device 5. That is, the controller 9A allows discharge from the electric storage device 5 and prohibits charge to the electric storage device (S53). Step S53 is in the same state as Step S13 described above. Thereafter, the controller 9A executes control of the electric storage device 5 continuously.

As described above, the first set value E1 and the second set value E2 are different from each other, and a relation between the feasible state of charge and discharge of the electric storage device 5 and the voltage value E has hysteresis. Accordingly, it can be suppressed that the feasible state of charge and discharge of the electric storage device 5 becomes unstable when the voltage value E is between the first set value E1 and the second set value E2.

For example, if the first set value E1 and the second set value E2 are set to an equal value, when the voltage value E fluctuates near E1 and E2, the feasible state of charge and discharge of the electric storage device 5 is switched frequently. Therefore, the feasible state of charge and discharge of the electric storage device 5 becomes quite unstable.

On the other hand, as in the third embodiment, because the relation between the feasible state of charge and discharge of the electric storage device 5 and the voltage E has hysteresis, when the voltage E is between the second set value E2 and the first set value E1, the controller 9A maintains the history of the feasible state of charge or discharge of the electric storage device 5. Accordingly, the feasible state of charge and discharge of the electric storage device 5 is stabilized without being frequently switched.

Further, according to the third embodiment, when the distance between the first vehicle 1A and the second vehicle 1B is short, the controller 9A allows charge or discharge of the electric storage device 5. When the distance between the first vehicle 1A and the second vehicle 1B is long, the controller 9A prohibits charge and discharge of the electric storage device 5.

Further, according to the third embodiment, it is suppressed that the voltage difference between the power lines 11 and 12 increases excessively or decreases excessively. Accordingly, the voltage difference between the power lines 11 and 12 is stabilized.

At least two of the first to third embodiments can be combined with one another.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A railroad system comprising a first vehicle and a second vehicle electrically connected to a power line, wherein:
   the first vehicle includes:
      a drive part,
      an inverter configured to drive the drive part by acquiring power from the power line,
      an electric storage device configured to selectively supply power to the power line and accumulate power from the power line, and
      a control part configured to control feasibility of charge or discharge of the electric storage device based on a detection value of a distance between the first vehicle and the second vehicle, the detection value when charge or discharge of the electric storage device is switched from an allowable state to a prohibited state being a first set value, the detection value when charge or discharge of the electric storage device is switched from the prohibited state to the allowable state being a second set value, and the first set value being larger than the second set value,
   when the detection value of the distance between the first vehicle and the second vehicle is larger than the first set value, the control part prohibits charge and discharge of the electric storage device,
   when the detection value of the distance between the first vehicle and the second vehicle is smaller than the second set value, the control part allows charge and discharge of the electric storage device, and
   when the detection value of the distance between the first vehicle and the second vehicle is between the first set value and the second set value, the control part maintains a feasible state of charge or discharge of the electric storage device.

2. The railroad system of claim 1, wherein a relation between the detection value and feasibility of charge or discharge of the electric storage device has hysteresis.

3. The railroad system of claim 1, wherein the electric storage device supplies power to the inverter or accumulates power from the inverter.

4. The railroad system of claim 1, wherein the first vehicle further includes a communication part communicable with a base station installed in the second vehicle or on ground, and
   wherein the control part is configured to calculate the distance between the first vehicle and the second vehicle based on position information of the first vehicle and position information of the second vehicle acquired from the second vehicle or the base station.

\* \* \* \* \*